US009851718B2

(12) United States Patent
Booher

(10) Patent No.: US 9,851,718 B2
(45) Date of Patent: Dec. 26, 2017

(54) INTELLIGENT CONTROL APPARATUS, SYSTEM, AND METHOD OF USE

(71) Applicant: Steven R. Booher, Columbus, IN (US)

(72) Inventor: Steven R. Booher, Columbus, IN (US)

( * ) Notice: Subject to any disclaimer, the term of this patent is extended or adjusted under 35 U.S.C. 154(b) by 56 days.

(21) Appl. No.: 14/866,912

(22) Filed: Sep. 26, 2015

(65) Prior Publication Data

US 2016/0091898 A1 Mar. 31, 2016

Related U.S. Application Data

(60) Provisional application No. 62/056,470, filed on Sep. 26, 2014.

(51) Int. Cl.
*G05D 1/02* (2006.01)
*G01C 21/00* (2006.01)
*G01S 19/42* (2010.01)

(52) U.S. Cl.
CPC ......... *G05D 1/0219* (2013.01); *G01C 21/005* (2013.01); *G05D 1/0274* (2013.01); *G05D 1/0278* (2013.01); *G01S 19/42* (2013.01); *G05D 2201/0208* (2013.01)

(58) Field of Classification Search
CPC ......... G05D 1/0274; G05D 2201/0208; G05D 1/0219; G05D 2201/0201; G05D 1/021; G05D 2201/0215
See application file for complete search history.

(56) References Cited

U.S. PATENT DOCUMENTS

| 5,011,288 A | 4/1991 | Noji et al. |
| 5,495,427 A | 2/1996 | Puma et al. |
| 5,758,298 A | 5/1998 | Guldner |
| 5,940,346 A | 8/1999 | Sadowski et al. |
| 5,955,973 A | 9/1999 | Anderson |
| 5,956,250 A | 9/1999 | Gudat et al. |
| 5,974,347 A | 10/1999 | Nelson |
| 6,009,358 A | 12/1999 | Angott et al. |
| 6,157,592 A | 12/2000 | Kriz et al. |

(Continued)

FOREIGN PATENT DOCUMENTS

WO   WO 2010/077198 A1   7/2010

OTHER PUBLICATIONS

"Distributed Control for a Modular, Reconfigurable Cliff Robot", Erik Mumm et al., May 2002 IEEE.*

*Primary Examiner* — Jelani A Smith

(74) *Attorney, Agent, or Firm* — Roberts IP Law; John Roberts

(57) ABSTRACT

Provided are systems and methods for controlling the steering of a machine such as a mower, sprayer, raker, or snow plow. A control system may comprise a unitary structure such as a tablet computer may be removably attached with the machine, the control system tracking movement of the machine over an area using GPS systems or the like and then automatically calculating, storing, and transmitting optimized travel paths that minimize the distance traveled by the machine for subsequent movements of the machine over the same area. Systems may automatically detect excluded areas within the area, and may automatically update optimized travel paths during subsequent uses at the option of a user. Path data and other information may be stored remotely and access thereto controlled by a service provider. Record-replay functionality is disclosed.

20 Claims, 12 Drawing Sheets

(56) References Cited

U.S. PATENT DOCUMENTS

| | | | |
|---|---|---|---|
| 6,255,793 B1 | 7/2001 | Peless et al. | |
| 6,338,013 B1* | 1/2002 | Ruffner | A01B 69/008 |
| | | | 180/167 |
| 6,393,360 B1 | 5/2002 | Ma | |
| 6,445,344 B1 | 9/2002 | Wise et al. | |
| 6,493,458 B2 | 12/2002 | Yasui et al. | |
| 6,556,942 B1 | 4/2003 | Smith | |
| 6,590,834 B1 | 7/2003 | Highfill | |
| 6,611,738 B2 | 8/2003 | Ruffner | |
| 6,674,687 B2 | 1/2004 | Zeitzew | |
| 6,995,708 B2 | 2/2006 | Schmidt | |
| 7,648,004 B1 | 1/2010 | Larouche et al. | |
| 2004/0210357 A1 | 10/2004 | McKay et al. | |
| 2007/0022008 A1* | 1/2007 | Kingsborough | G06Q 20/10 |
| | | | 705/14.17 |
| 2010/0324731 A1* | 12/2010 | Letsky | A01D 34/008 |
| | | | 700/245 |
| 2013/0238130 A1* | 9/2013 | Dorschel | A01D 34/008 |
| | | | 700/259 |
| 2015/0348419 A1* | 12/2015 | Matthews | A01B 79/02 |
| | | | 701/117 |

\* cited by examiner

INTELLIGENT CONTROL APPARATUS, SYSTEM, AND METHOD OF USE

CROSS-REFERENCE TO RELATED APPLICATIONS

The present application claims priority to, incorporates herein by reference, and is a non-provisional of U.S. Patent Application No. 62/056,470 to Steven R. Booher of Columbus, Ind., entitled Intelligent Control Apparatus, System, and Method of Use, which was filed on Sep. 26, 2014.

FEDERALLY SPONSORED RESEARCH OR DEVELOPMENT

None.

TECHNICAL FIELD

The present invention relates to various intelligent control apparatus and methods of use, including novel equipment and methods of use for mowing, trimming, spraying, and the like.

BACKGROUND

Listed below and incorporated herein are various patents and published patent applications. The contents of each of these patents and published patent applications are hereby incorporated herein by reference in their entireties, and various technical details disclosed therein may optionally be used to implement various aspects of the present system and method as will be apparent to persons of skill in the art.

U.S. Pat. No. 6,611,738 B2 describes a general purpose mobile device, whose navigation is based on GPS. A movement teach-in is disclosed based on the GPS data, where a teach-in is a technique in the field of robotics for teaching a robot to mimic a certain sequence of motor commands or motor positions by moving a robot manually or by means of a remote control. The user can give additional information about the working area, like the position of a newly planted tree. However, training and improving of the mower's visual obstacle detection by the user is not possible.

WO 2010/077198 describes an autonomous robotic lawn mower and a method for establishing a wireless communication link between the lawn mower and a user. A border-wire-based robotic mower is disclosed and is able to communicate with a cellular network structure. The mower can inform the user when the mower detects a "situation". The user can send back an acknowledgement signal or a message. However, no information for clarification of an uncertain detection result or for improving a classifier installed in the mower software is mentioned. The user is not able to improve the classifier, and also different obstacles cannot trigger different behaviors of the mower.

US 2010/0324731 A1 describes a method for establishing a desired area of confinement for an autonomous robot, and an autonomous robot implementing a control system for executing the same. An already known method of movement teach-in for acquiring a user-defined perimeter is described. Further, an interaction between a user and the mower via a smart phone (or similar devices) is disclosed. First, a map generated by means of perimeter information can be displayed on the smart phone. Second, the mower may be remotely controlled via the smart phone. Third, the base station may act as a communication gateway between smart phone and mower.

The problem of locating mobile platforms or robots simply and effectively has been attempted and partially solved by many different approaches. The techniques include dead reckoning, heading, ground-based RF beacons, and the GPS system. Time-of-flight (TOF) systems using audio, ultrasonic, and laser-based components have been used. Inertial navigation, active beam navigation systems, and optical positioning systems are used with triangulation and trilateration methods. Also landmark navigation with natural and artificial landmarks with visioning systems have been used.

Local positioning systems are known in the art. U.S. Pat. No. 5,974,347 (1999) describes an automatic location system using three radio frequency (RF) transmitters to define circle equations which are solved simultaneously to determine the location of the mower. This approach requires accurate rotation control of a loop antenna and suffers from RF reflections that cause errors in measuring the angles used in the calculations. Also the transmitters had to have separate frequencies to identify them, and the figure-8 pattern of the directional antenna necessitated a sequencing circuit to verify sequences of the nulls received.

U.S. Pat. No. 6,009,358 to Angott, et al. (1999) describes a programmable lawn mower using coded RF and audio signals. Coded signals are sent from the carriage or vehicle to each of the locating transmitters which send an acknowledgement, requiring a processor for codification and identification, adding to the complexity of the system. The signals from locating transmitters are continuous signals that may have interference from reflections from objects in the area causing errors and malfunctions. Further, the use of two microphones closely spaced on the vehicle to give angular position relative to the locating transmitter is not as accurate as utilizing a given greater distance between two locating transmitters.

U.S. Pat. No. 5,940,346 to Sadowski et al. (1996) describes a modular robotic platform with an acoustic navigation system. It requires three or more beacons, different RF frequencies per each beacon, a pseudo-noise generator, continuous wave acoustic signals, uses pulse modulation of the RF signal, requires advanced beacon design for accurate detection of the acoustic signal. It also suffers from Doppler frequency shift of the acoustic signal that must be taken into account.

A method of using acoustical signals to measure distance is given by Highfill in U.S. Pat. No. 6,590,834 (2003). This is applied to measuring the location of a rover carried by an individual in making surveying measurements in wooded areas. The method of determining distance uses an RF and an acoustic transmitter on the rover to transmit pulses to an array of receiver pods. Multiple pods are required to acquire data to be able to calculate the position of the rover.

U.S. Pat. No. 6,445,344 to Wise, et al. (2002), describes a local area positioning system utilizing multiple platforms in communication with each other in a local area network. It is similar to a global positioning system but on a more limited space providing three dimensional location of sensor platforms such as aircraft which would be an expensive, complex, and cumbersome system if applied to small moving vehicles such as an automated lawn mower.

U.S. Pat. No. 6,674,687 to Zeitzew (2004), uses a system and method for navigation using two-way ultrasonic positioning. However, the RF and ultrasonic signals are encoded and the two-way travel of the ultrasonic signal adds to the complexity of the system. The use of ultrasonic frequencies also has more attenuation in the air than lower audio frequencies.

U.S. Pat. No. 6,157,592 to Kriz, et al. (2000), discloses a three dimensional acoustic position determining system. It requires at least three transmitters, each coded for identification, and also requires a synchronization signal. The application is for determining the position of a receiver mounted on a person or object.

A method of measuring azimuth and distances from a moving platform and stationary reflectors is proposed by Noji, et al. in U.S. Pat. No. 5,011,288 (1991). The angle between adjacent reflectors is measured to calculate the azimuth.

U.S. Pat. No. 6,995,708 to Schmidt (2006) describes a local positioning system to locate a cell phone user by sniffing earth based media and using bluetooth standards and GPS. Another system to locate a person with a cell phone is given in U.S. Pat. No. 6,748,224 to Chen, et al. (2004) describing a software implementation of a local positioning system It uses the radio propagation parameters in the CDMA and TDMA links of a cell phone system to establish the position of a digital cell phone.

U.S. Pat. No. 6,255,793 to Peless et al. (2001) describes a navigation method for autonomous machines using proximity sensors and markers defining a perimeter of the working area.

U.S. Pat. No. 5,956,250 to Gudat et al. (1999) describes a vehicle navigation system using VPS, GPS, and MPS. It includes accelerometers, gyros, odometers and Kalman filters.

U.S. Pat. No. 5,758,298 to Guldner (1998) describes an autonomous navigation system for a mobile robot or manipulator and guides a robot to a predetermined point, for a transport or cleaning system. It uses a robot coordinate system for collision avoidance.

U.S. Pat. No. 5,495,427 to Puma et al. (1996) describes an ultrasonic position and orientation tracking system for monitoring articles in close proximity such as a pilot's helmet in a cockpit.

U.S. Pat. No. 6,393,360 to Ma (2002) describes a system for locating and directing a vehicle such as an automobile. It is a local positioning system assisting a driver in reaching their destination.

U.S. Pat. No. 5,955,973 to Anderson (1999) describes a field navigation system for navigating a farm vehicle in an agricultural field using a GPS system.

Local positioning apparatuses or systems described in U.S. Pat. No. 5,904,725 to Iisaka (1999), and U.S. Pat. No. 6,493,458 to Yasui, et al. (2002) relate to determining the position of a vehicle in traffic and traffic safety.

U.S. Pat. No. 6,556,942 to Smith (2003) shows a short range indoor radiolocation system allowing the location of an item provided with an RF tag.

In addition to the foregoing patents and published patent applications, additional patents and published patent applications were also incorporated by reference in their entireties into the provisional patent application on which this application is based, U.S. Patent Application No. 62/056,470, and all the patents and published patent applications incorporated therein are likewise incorporated herein by reference and incorporation.

The contents of each of the documents referred to in each of the paragraphs above are hereby incorporated herein by reference in their entireties. While numerous systems have been disclosed, they all have drawbacks and limitations, and there exists a need for an improved intelligent control apparatus, system, and method of use.

SUMMARY

The present invention elegantly overcomes various drawbacks and limitations of past systems and provides numerous additional benefits as will be apparent to persons of skill in the art. For example, provided in various example embodiments is a method of defining one or more optimized travel paths for an autonomously-steering machine to travel over one or more areas, comprising: a) positioning the autonomously-steering machine at a starting point, causing a GPS system attached with the autonomously-steering machine to obtain the location of the starting point, and causing a memory device attached with the autonomously-steering machine to record the starting point; b) manually steering the autonomously-steering machine while causing it to move from the starting point over the area; c) causing the GPS system to continuously track location of the autonomously-steering machine during said movement; d) causing the memory device to record the tracked location of the autonomously-steering machine as map data in the memory device; e) causing a processor attached with the autonomously-steering machine to process the map data in view of effective travel path width data for the autonomously-steering machine to determine one or more perimeters of the one or more areas over which the autonomously-steering machine did travel; f) causing the processor to process the map data in view of the effective travel path width data for the autonomously-steering machine to determine one or more perimeters of any excluded areas over which the autonomously-steering machine did not travel within the one or more areas; g) causing the processor to process the map data and the effective travel path width data for the autonomously-steering machine to generate optimized travel path data corresponding to one or more optimized travel paths that when traveled by the autonomously-steering machine will cause the autonomously-steering machine to travel over the one or more areas but not the one or more excluded areas while tending to minimize the total distance traveled by the autonomously-steering machine; h) moving the autonomously-steering machine over the area while an electronically-controlled steering controller device attached with the autonomously-steering machine and driven by the optimized travel path data controls steering of the autonomously-steering machine; i) manually overriding the electronically-controlled steering controller device during said movement in step h) to cause the autonomously-steering machine to deviate from the one or more optimized travel paths; j) causing the GPS system to continuously track location of the autonomously-steering machine during said deviated movement; k) causing the memory device to record the tracked location of the autonomously-steering machine during said deviated movement as deviated map data in the memory device; l) after the beginning of said deviated movement, the user interacting with an electronic user interface in electronic communication with the memory device to indicate whether the one or more optimized travel paths should be updated with said deviated map data; and m) causing the optimized travel path data to update to correspond to said deviated map data and thereby updating the optimized travel path to correspond to said deviation, by the user indicating with the electronic user interface that the one or more optimized travel paths should be updated with said deviated map data.

In various example embodiments the method may further comprise the steps of inputting into the processor device machine-specific data corresponding to the effective travel path width and turning radius of the autonomously-steering machine. In various example embodiments the autonomously-steering machine may comprise a mower having a cutting path width, and the steps of inputting into the processor device machine-specific data corresponding to the effective travel path width comprises inputting the cutting path width into the processor. In various example embodiments the autonomously-steering machine may comprise front and rear wheels separated by a wheelbase length, the method further comprising the steps of inputting into the processor device machine-specific data corresponding to any of: the wheelbase length; the position of the wheels relative to the mowing deck; identifying wheels that pivot to steer the machine; or outer dimensions of portions of the machine that extend laterally beyond the wheels, and the locations of those portions relative to the mowing deck. In various example embodiments the method may further comprise causing any of the machine-specific data, map data, optimized travel path data, or updated optimized travel path data to be electronically communicated from the memory device to a remotely-located data storage device. In various example embodiments the method may further comprise causing any of the machine-specific data, map data, optimized travel path data, or updated optimized travel path data to be electronically communicated from the remotely-located data storage device to the memory device. In various example embodiments the method may further comprise causing any of the machine-specific data, map data, optimized travel path data, or updated optimized travel path data to be electronically communicated from the remotely-located data storage device to a second memory device attached with a second autonomously-steering machine. In various example embodiments the method may further comprise causing the second autonomously-steering machine to use any of the machine-specific data, map data, optimized travel path data, or updated optimized travel path data to travel over the one or more areas but not the one or more excluded areas. In various example embodiments steps h) through m) are repeated serially a plurality of times.

In various example embodiments the processor device, memory device, GPS system, and electronic user interface all form part of a unitary structure that is removably attachable with the autonomously-steering machine, and the method further includes the steps of attaching and detaching the unitary structure with the autonomously-steering machine. In various example embodiments the electronically-controlled steering controller device is removably attachable with the autonomously-steering machine, and the method further includes the steps of attaching and detaching the electronically-controlled steering controller device with the autonomously-steering machine. In various example embodiments the method may further comprise causing the processor device to track and the memory device to store electronic usage data corresponding to one or more durations of use of the autonomously-steering machine, the method further comprising the steps of causing the electronic usage data to be electronically communicated to a remotely-located data storage device. In various example embodiments the method may further comprise causing information related to maintaining the autonomously-steering machine based on the electronic usage data to be electronically communicated to the user. In various example embodiments the method may further comprise electronically unlocking access to, or electronically unlocking the ability to use, the optimized travel path data by making a payment to a party in remote electronic communication with the processor. In various example embodiments the method may further comprise using a computer structure in electronic communication with the Internet to access an electronic portal through the Internet and thereby viewing or downloading information comprising any of the machine-specific data, map data, optimized travel path data, or updated optimized travel path data. In various example embodiments the method may further comprise viewing or downloading information comprising any of the machine-specific data, map data, optimized travel path data, or updated optimized travel path data, for instance by viewing or downloading an image of a map of the area overlaid with an optimized travel path. In various example embodiments the method may further comprise using a computer structure in electronic communication with the Internet to access an electronic portal through the Internet and thereby viewing or downloading any of the electronic usage data corresponding to one or more durations of use of the autonomously-steering machine, or information related to maintaining the autonomously-steering machine based on the electronic usage data. In various example embodiments the method may further comprise causing the processor to generate optimized travel path data corresponding to a plurality of optimized travel paths that when traveled by the autonomously-steering machine will cause the autonomously-steering machine to travel over the one or more areas but not the one or more excluded areas while tending to minimize the total distance traveled by the autonomously-steering machine; wherein the plurality of optimized travel paths include travel paths at different angles that each create unique visual effects on the area when the autonomously-steering machine travels on said travel paths.

Also provided in various example embodiments is an autonomously-steering machine configured to travel under its own power over one or more areas by following one or more optimized travel paths, the autonomously-steering machine comprising: a steering system capable of being steered either manually by a user or by an electronically-controlled steering controller device; an electronically-controlled steering controller device; a unitary structure that is removably attached with the autonomously-steering machine, the unitary structure comprising: a processor structure in electronic communication with the electronically-controlled steering controller device; a memory device structure in electronic communication with the processor structure; a GPS system structure in electronic communication with the memory device structure; and an electronic user interface structure in electronic communication with the memory device structure; wherein the unitary structure is configured to: a) obtain and record the location of a starting point; b) continuously track location of the autonomously-steering machine while it is moved and manually steered from the starting point over an area; c) record the tracked location of the autonomously-steering machine as map data in the memory device structure; d) process the map data in view of effective travel path width data for the autonomously-steering machine to determine one or more perimeters of the one or more areas over which the autonomously-steering machine has traveled, to determine one or more perimeters of any excluded areas over which the autonomously-steering machine did not travel within the one or more areas, and to generate optimized travel path data corresponding to one or more optimized travel paths that when traveled by the autonomously-steering machine will cause the autonomously-steering machine to travel over the one or more areas but not the one or more excluded areas while tending to minimize the total distance traveled by the autonomously-steering machine; the electronically-controlled steering controller device configured to steer the autonomously-steering machine over the area but not over the excluded areas based on the optimized travel path data, and further configured to be manually overridden to cause the autonomously-steering machine to deviate from the one or more optimized travel paths, whereupon the unitary structure is configured to update the optimized travel path data based on the deviation at the option of the user. In various example embodiments the autonomously-steering machine may include any or all of the features and capabilities described herein, and may be used to accomplish any or all of the method steps described herein.

Further provided in various example embodiments is an autonomously-steering machine configured to travel under its own power over one or more areas by following one or more optimized travel paths, the autonomously-steering machine comprising: steering system means capable of being steered either manually by a user or by an electronically-controlled steering controller means; a unitary structure that is removably attached with the autonomously-steering machine, the unitary structure comprising: processor means in electronic communication with the electronically-controlled steering controller means; memory means in electronic communication with the processor means; GPS means in electronic communication with the memory means; and electronic user interface means in electronic communication with the memory means; wherein the unitary structure is configured to: a) obtain and record the location of a starting point; b) continuously track location of the autonomously-steering machine while it is moved and manually steered from the starting point over an area; c) record the tracked location of the autonomously-steering machine as map data in the memory means; d) process the map data in view of effective travel path width data for the autonomously-steering machine to determine one or more perimeters of the one or more areas over which the autonomously-steering machine has traveled, to determine one or more perimeters of any excluded areas over which the autonomously-steering machine did not travel within the one or more areas, and to generate optimized travel path data corresponding to one or more optimized travel paths that when traveled by the autonomously-steering machine will cause the autonomously-steering machine to travel over the one or more areas but not the one or more excluded areas while tending to minimize the total distance traveled by the autonomously-steering machine; the electronically-controlled steering controller device configured to steer the autonomously-steering machine over the area but not over the excluded areas based on the optimized travel path data, and further configured to be manually overridden to cause the autonomously-steering machine to deviate from the one or more optimized travel paths, whereupon the unitary structure is configured to update the optimized travel path data based on the deviation at the option of the user.

Also provided in various example embodiments is record-replay functionality, where an autonomously-steering machine may be configured to travel under its own power over a path manually chosen by the user while in a record mode, e.g., by driving the tractor normally over an area, and then to steer automatically over that exact same path one or more times at the option of the user in a replay mode. For example, provided is an autonomously-steering machine configured to travel under its own power over one or more areas by precisely following one or more travel paths that was previously recorded, the autonomously-steering machine comprising: a steering system capable of being steered either manually by a user or by an electronically-controlled steering controller device; an electronically-controlled steering controller device; a unitary structure that is removably attached with the autonomously-steering machine, the unitary structure comprising: a processor structure in electronic communication with the electronically-controlled steering controller device; a memory device structure in electronic communication with the processor structure; a GPS system structure in electronic communication with the memory device structure; and an electronic user interface structure in electronic communication with the memory device structure; wherein the unitary structure is configured to: a) obtain and record the location of a starting point; b) continuously track location of the autonomously-steering machine while it is moved and manually steered from the starting point over an area; c) record the tracked location of the autonomously-steering machine as map data in the memory means; and d) replay the map data to cause the autonomously-steering machine to travel over precisely the same tracked location that was recorded; wherein the electronically-controlled steering controller device configured to steer the autonomously-steering machine over precisely the same tracked location that was recorded as map data. In various example embodiments the autonomously-steering machine may include any or all of the features and capabilities described herein, and may be used to accomplish any or all of the method steps described herein.

While various aspects of various example embodiments are provided herein, the invention is set forth only in the claims as allowed by the patent office in this or related applications, and the summaries and descriptions of certain examples are not in any way to limit, define or otherwise establish the scope of legal protection.

BRIEF DESCRIPTION OF THE DRAWINGS

Examples of the invention can be better understood with reference to the following figures. The components within the figures are not necessarily to scale, emphasis instead being placed on clearly illustrating example aspects of the invention. In the figures, like reference numerals designate corresponding parts throughout the different views. It will be understood that certain components and details may not appear in the figures to assist in more clearly describing the invention.

Figure 1:
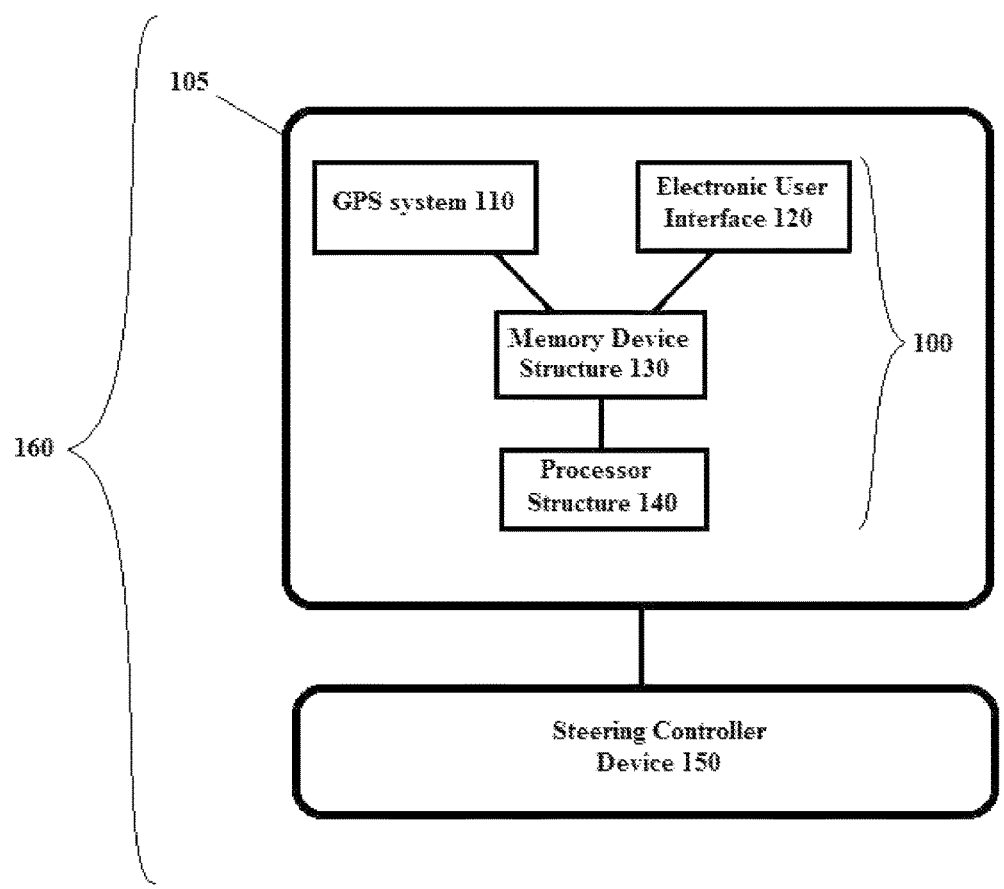
FIG. 1 is a diagram depicting various aspects of example embodiments.
Figure 2:
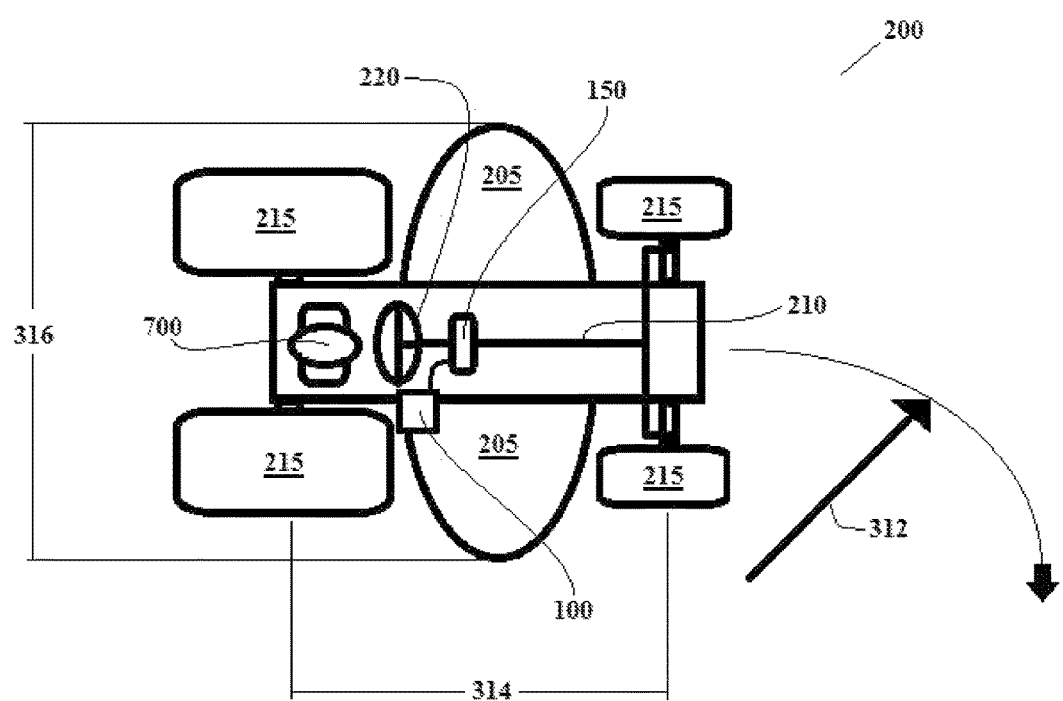
FIG. 2 is a top plan view of an example machine that may be used in connection with various example embodiments, namely a lawnmower comprising a control system according to an example embodiment of the present invention.

The invention is not limited to what is shown in these example figures. The invention is broader than the examples shown in the figures and covers anything that falls within any of the claims.

DETAILED DESCRIPTION OF EXAMPLE EMBODIMENTS

Reference is made herein to some specific examples of the present invention, including any best modes contemplated by the inventor for carrying out the invention. Examples of these specific embodiments are illustrated in the accompanying figures. While the invention is described in conjunction with these specific embodiments, it will be understood that it is not intended to limit the invention to the described or illustrated embodiments. To the contrary, it is intended to cover alternatives, modifications, and equivalents as may be included within the spirit and scope of the invention as defined by the appended claims.

In the following description, numerous specific details are set forth in order to provide a thorough understanding of the present invention. Particular example embodiments of the present invention may be implemented without some or all of these specific details. In other instances, process operations well known to persons of skill in the art have not been described in detail in order not to obscure unnecessarily the present invention. Various techniques and mechanisms of the present invention will sometimes be described in singular form for clarity. However, it should be noted that some embodiments include multiple iterations of a technique or multiple mechanisms unless noted otherwise. Similarly, various steps of the methods shown and described herein are not necessarily performed in the order indicated, or performed at all in certain embodiments. Accordingly, some implementations of the methods discussed herein may include more or fewer steps than those shown or described. Further, the techniques and mechanisms of the present invention will sometimes describe a connection, relationship or communication between two or more entities. It should be noted that a connection or relationship between entities does not necessarily mean a direct, unimpeded connection, as a variety of other entities or processes may reside or occur between any two entities. Consequently, an indicated connection does not necessarily mean a direct, unimpeded connection unless otherwise noted.

With reference to FIGS. 1-5, the present control apparatus, system, and method of use may comprise a control system 100 combined with any of a variety of machines 200, such as robots, tractors, or other vehicles 200, which may be electronically controlled as part of an automated or semi-automated (or autonomous or semi-autonomous) system. In various example embodiments a control system 100 may be formed with a machine 200 such as a lawn mower 200 or other tractor 200, or may be added as a kit 160 to an existing machine 200. The control system 100 may comprise various mechanisms to automate and control the steering of the machine 200, such as hydraulics, as will be known to persons of skill in the art of self-steering tractors, for instance. See, for example, US 20040210357 A1 to McKay et al., entitled Auto-Steering Apparatus and Method, published on Oct. 21, 2004 and incorporated herein by reference. The control system 100 may alternatively or also comprise various electronic mechanisms to automate and control the steering of the machine 200, as will be known to persons of skill in the art of self-steering tractors, for instance. See, for example, the Novariant ECU-S1 Autosteering Control system 100 Solution available from Novariant, Inc. of Fremont, Calif.

Example tractors 200 that could be used with the present system could include a Kubota L6060 (driven forwards or backwards), a Kubota F-Series mower, a Kubota RTV side-by-side utility vehicle (or any other side-by-side or utility vehicle), a Toro GroundMaster, or any other suitable mower, tractor, or other machine or vehicle.

The control system 100 may comprise an auto-piloting system including a control system 100 in signal communication with a GPS system 110. In various example embodiments, the GPS system 110 may first acquire a position of the vehicle 200. A control system 100 may receive information regarding the position of the vehicle 200 and may be able to read, receive, stock, compare or calculate various controllable parameters, such as for example, instant position, speed, and acceleration of the vehicle 200.

For instance, the control system 100 may be provided with a reference path 460 corresponding to the path the vehicle 200 has to follow for a specific vehicular application. The reference path 460 is compared to the position received from the GPS system 110 and the control system 100 decides what level of curvature and speed has to be applied to the steering system 210, such as a steering wheel 220, via a control mechanism 150 for achieving an effective and appropriate piloting of the vehicle 200.

The control system 100 may then establish that the vehicle 200 has to go in a first direction at a first speed for tending toward the reference path 460. A command containing that information may be translated into a corresponding signal to control the control mechanism 150. For example, the signal may regard the direction of rotation and the speed at which an electric motor rotationally coupled with a steering wheel 220 must go for a specific period of time in order for the vehicle 200 to meet the requirements of the command of the control system 100. For an example of a steering control mechanism 150, see U.S. Pat. No. 7,648,004 B1, issued Jan. 19, 2010 to Justin Larouche and Pascal Laplante and assigned to Novariant Inc., the entirety of which is incorporated herein by reference.

The control system 100 may be intelligent, and in various aspects builds upon and is an improvement over the control system and method disclosed in US 2010/0324731 A1 to Letsky, which is incorporated herein by reference. Letsky deals with an autonomous lawn mowing robot that includes a control system for establishing a desired confined area of lawn mowing. In Letsky, the robot is led around the perimeter of the area to be mowed, and the robot generates a map of the area to be mowed, i.e., the area within the perimeter. Obstacles inside the area, such as trees or boulders, must be affirmatively programmed in Letsky by putting the robot in "exclude" mode, then manually pushing the robot around the obstacle. After the robot is pushed around the obstacle, the exclude mode must be manually turned off, and the process continues.

The present control system 100 in various example embodiments improves upon Letsky by having the user 700 simply drive the vehicle 200 or other machine 200 equipped with the control system 100 (such as a riding lawnmower tractor 200) in the normal fashion to perform the entire task, such as mowing a yard or other area 420. Since the user 700 will naturally drive or otherwise steer the machine 200 around any obstacles 605, the control system 100, when in learning mode 400 (which may be referred to as "survey mode 400"), will automatically program itself with not only the perimeter 430 but also all the areas 440 actually traversed by the machine 200 (i.e., traversed areas 440), as well as all the areas 450 within the perimeter 430 that were avoided and not traversed (i.e., avoided areas 450). This data may be recorded in real time as the vehicle 200 is moving, such as when a mower 200 is mowing. The effective width 316 of the machine 200, such as the cutting width 316 of a mower 200 or the spraying width 316 of a sprayer 200, or the raking width 316 of a raker 200, or the plowing width 316 of a snow plow 200, its turning radius 312 or capabilities, and any other helpful data may also be input into the control system 100 in a programming mode 300. Note that all references herein to the words "mowing" and "mower" could likewise apply to "spraying" and "sprayer," "raking" and "raker," "plowing" and "plow," and other implement types as will be apparent to persons of skill in the art. Based on these manual inputs in the programming mode 300 and the data automatically input by driving the machine 200 in learning mode 400, the control system 100 may then generate a map 510 of the area 420 that was traversed, including a perimeter 430 and areas 450 that were excluded within the perimeter 430. The map may be displayed to a user 700 on a user's device 710, such as a mobile device 710, for instance a tablet, and may be overlaid on an existing digital map image, such as a satellite view map rendered by Google Maps or Google Earth (both trademarks of Google, Inc.), for example. In a planning mode 500, the control system 100 may then perform one or more of any suitable optimization algorithms to determine the most efficient travel path for that machine 200 to cover that same area 440. The control system 100 may then save this optimized travel path 460, which may subsequently be used to automatically steer or drive the machine 200 through the same optimized travel path 460 any number of times in the future. The control system 100 can establish, monitor, and re-establish the location of the machine 200 by GPS or by any known means as described, for example, in the art incorporated herein. The original and optimized travel path(s) 460 may optionally be shown to the user 700 on a digital map image, such as a Google Maps satellite image as described above, for instance in the planning mode 500.

Figure 3A:
FIG. 3A is a plan view of an area to be traversed by a machine, namely a lawn to be mowed by a lawnmower.
Figure 3B:
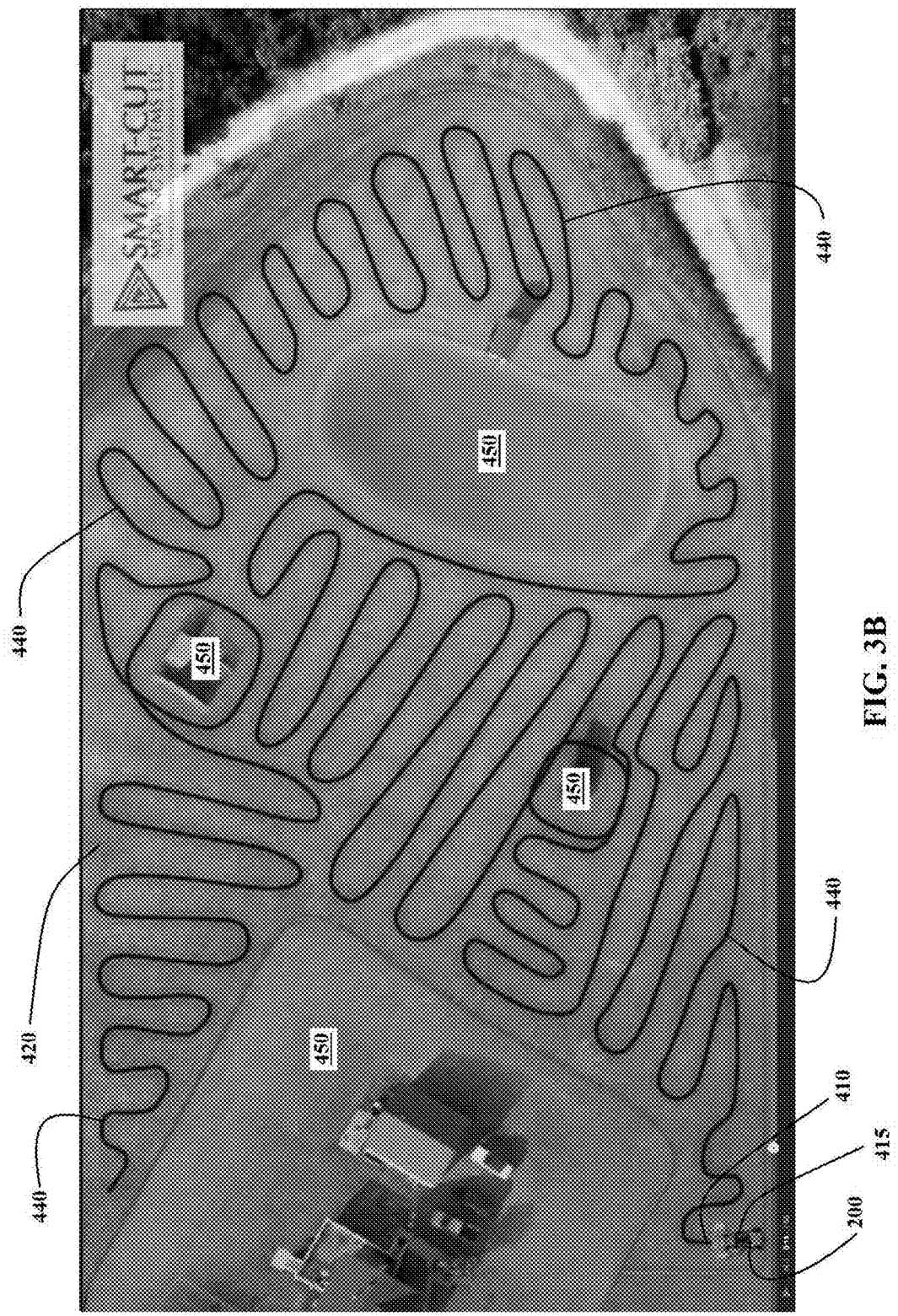
FIG. 3B is a plan view of the area of FIG. 3A showing the travel path of a machine, namely a lawnmower comprising a control system according to an example embodiment of the present invention, when manually operated by a user to mow the area of FIG. 3A while the control system was in a learning mode.
Figure 3C:
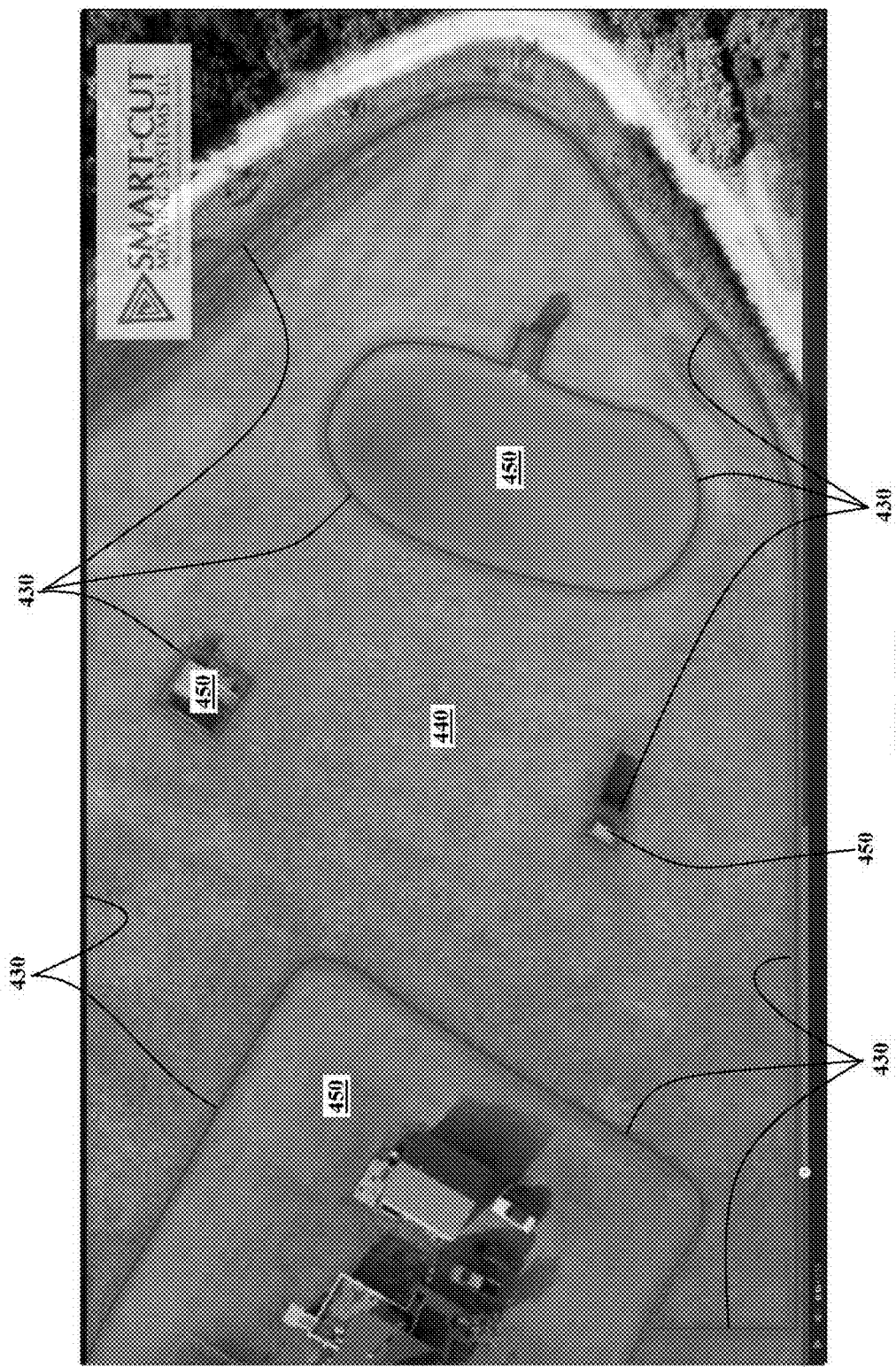
FIG. 3C is a plan view of the area of FIG. 3A with its perimeter and certain obstacles therein as calculated by the control system, highlighted for emphasis.
Figure 3D:
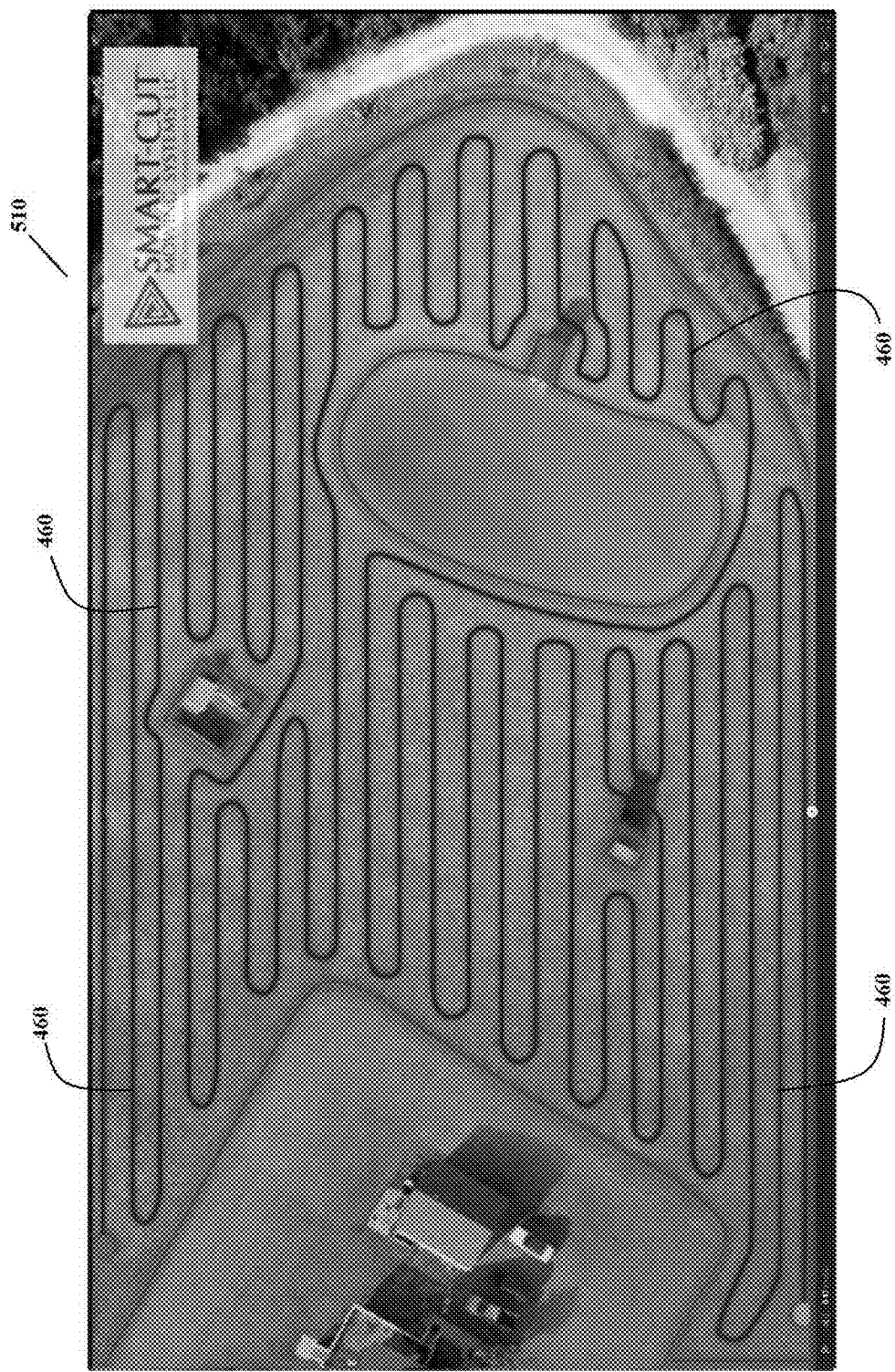
FIG. 3D is a schematic of an example optimized travel path for the machine of FIG. 2 over the area of FIG. 3A as calculated by the control system.
Figure 3E:
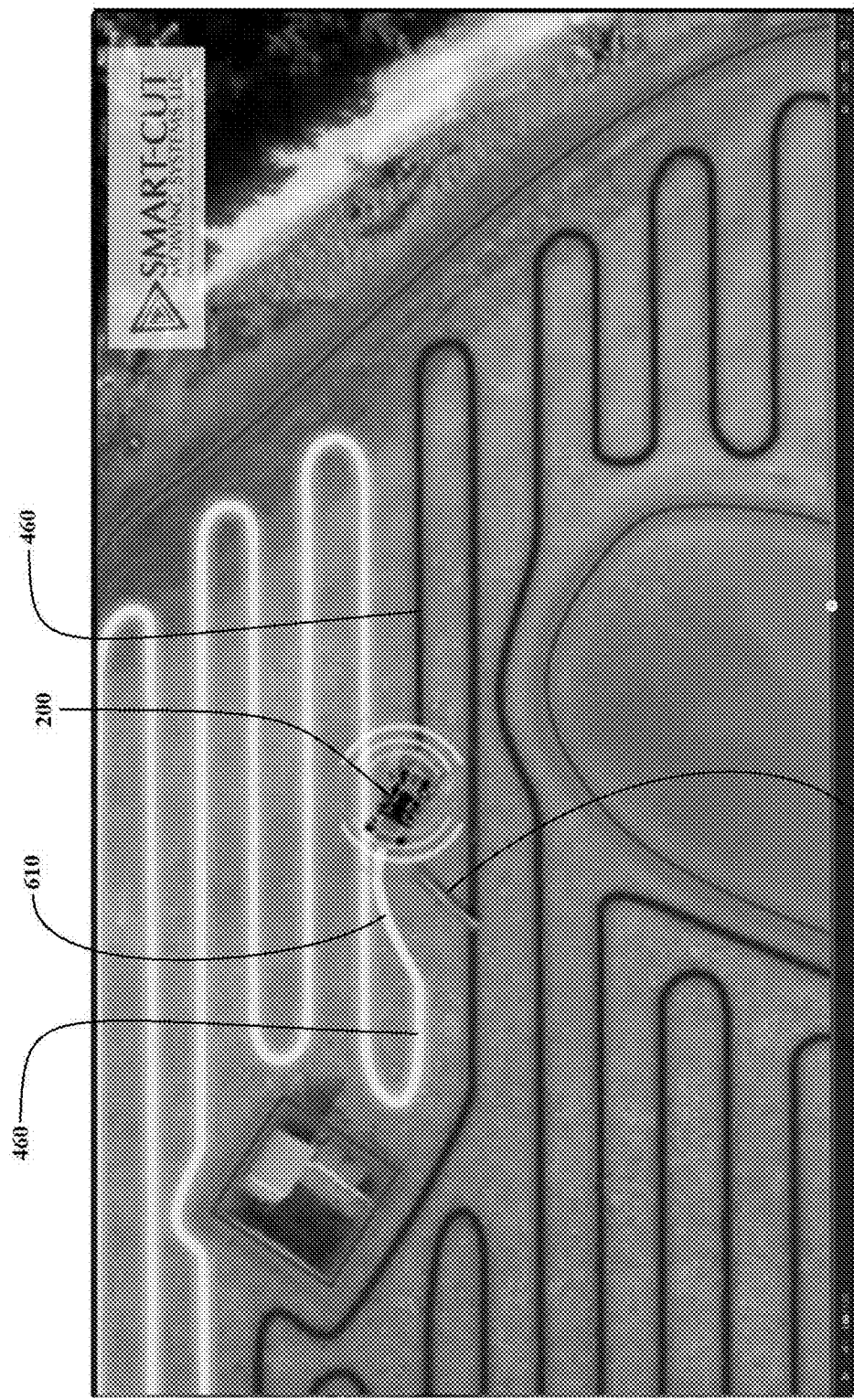
FIG. 3E is a schematic of the machine of FIG. 2 being manually steered around an obstacle that would interfere with the optimized travel path, then returning to autonomously steering itself along the optimized travel path of FIG. 3D.
Figure 3F:
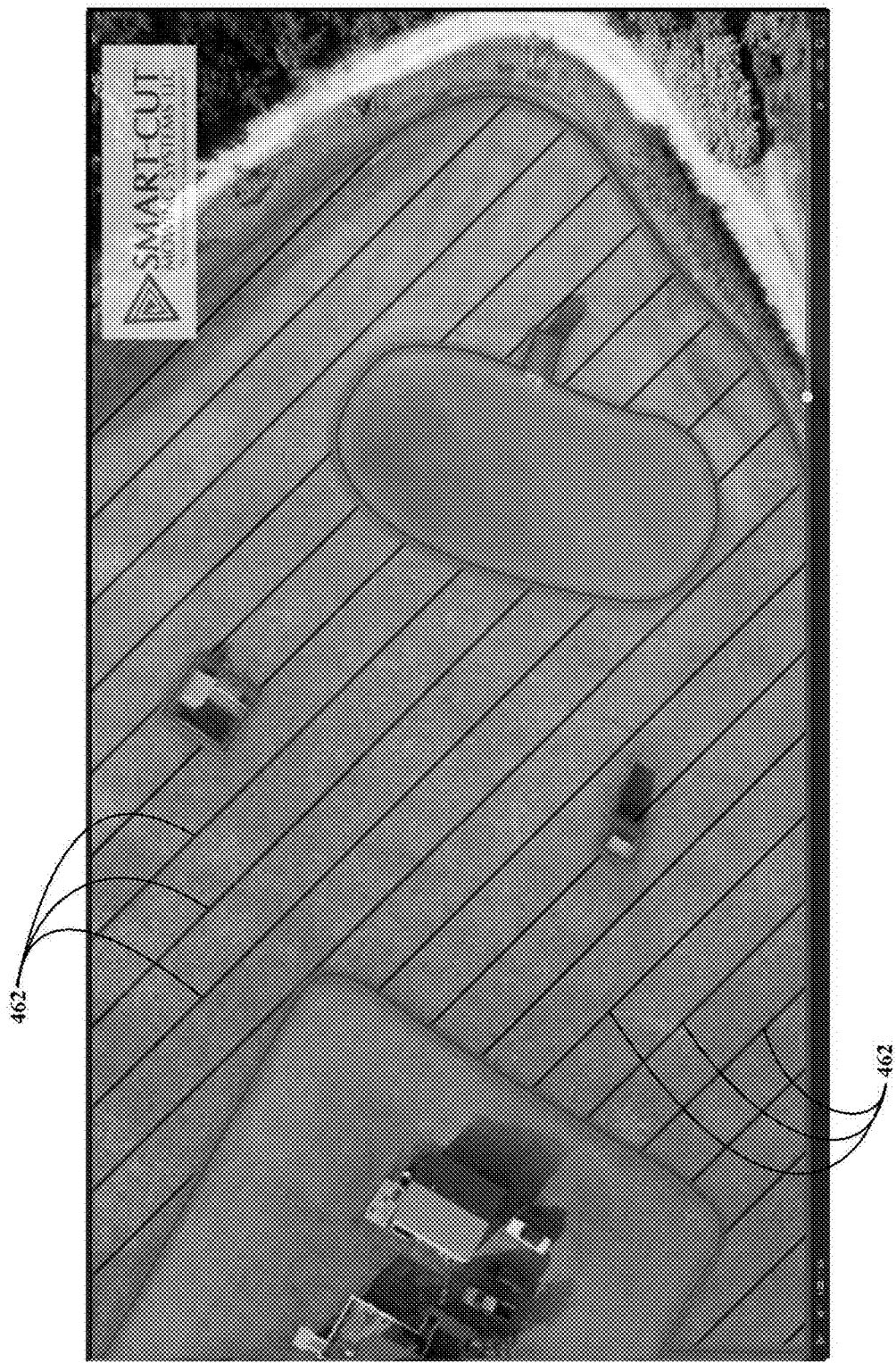
FIG. 3F is a schematic of an example first alternative optimized travel path primary direction for the machine of FIG. 2 over the area of FIG. 3A as calculated by the control system.
Figure 3G:
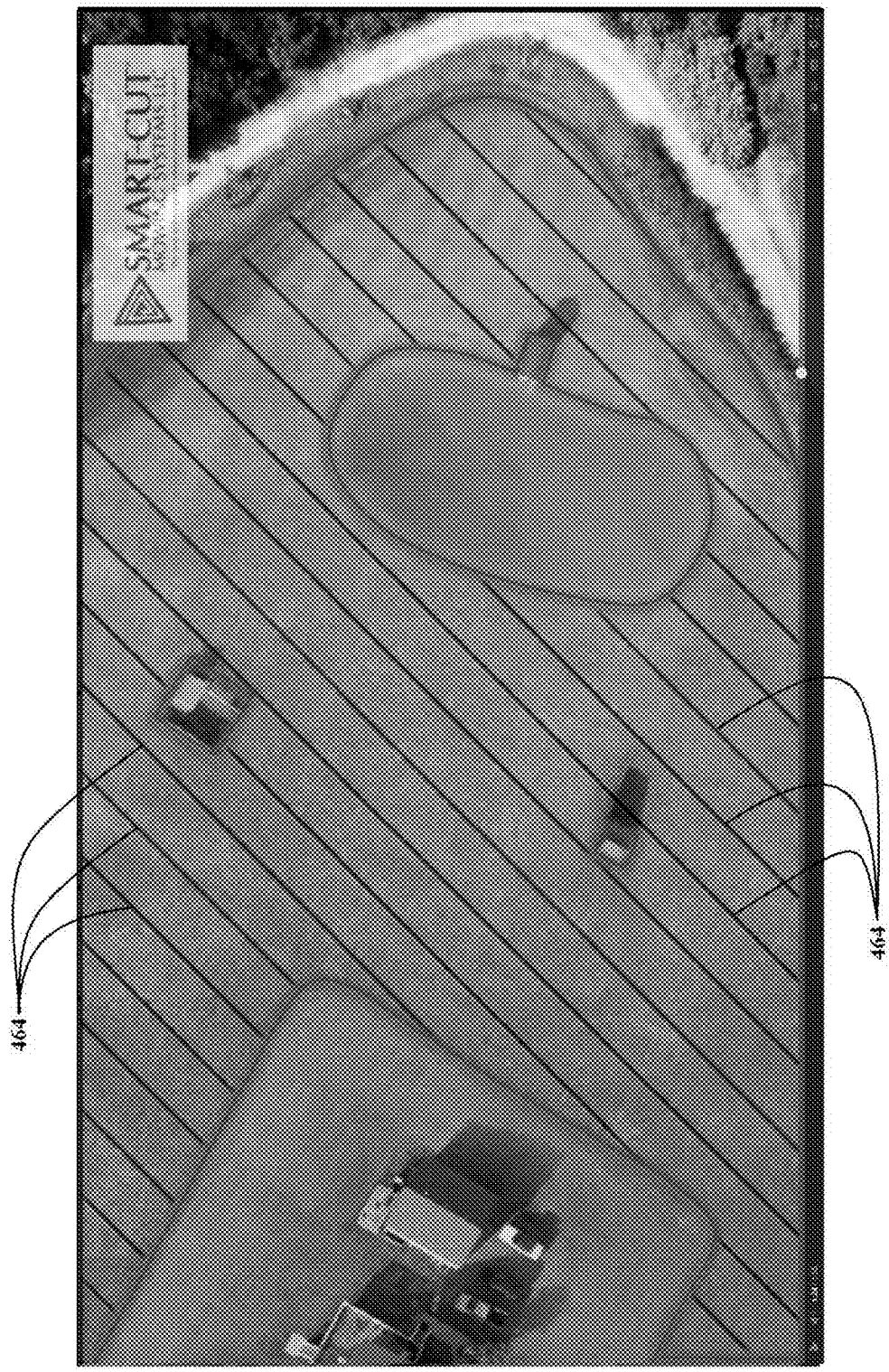
FIG. 3G is a schematic of an example second alternative optimized travel path primary direction for the machine of FIG. 2 over the area of FIG. 3A as calculated by the control system.
Figure 3H:
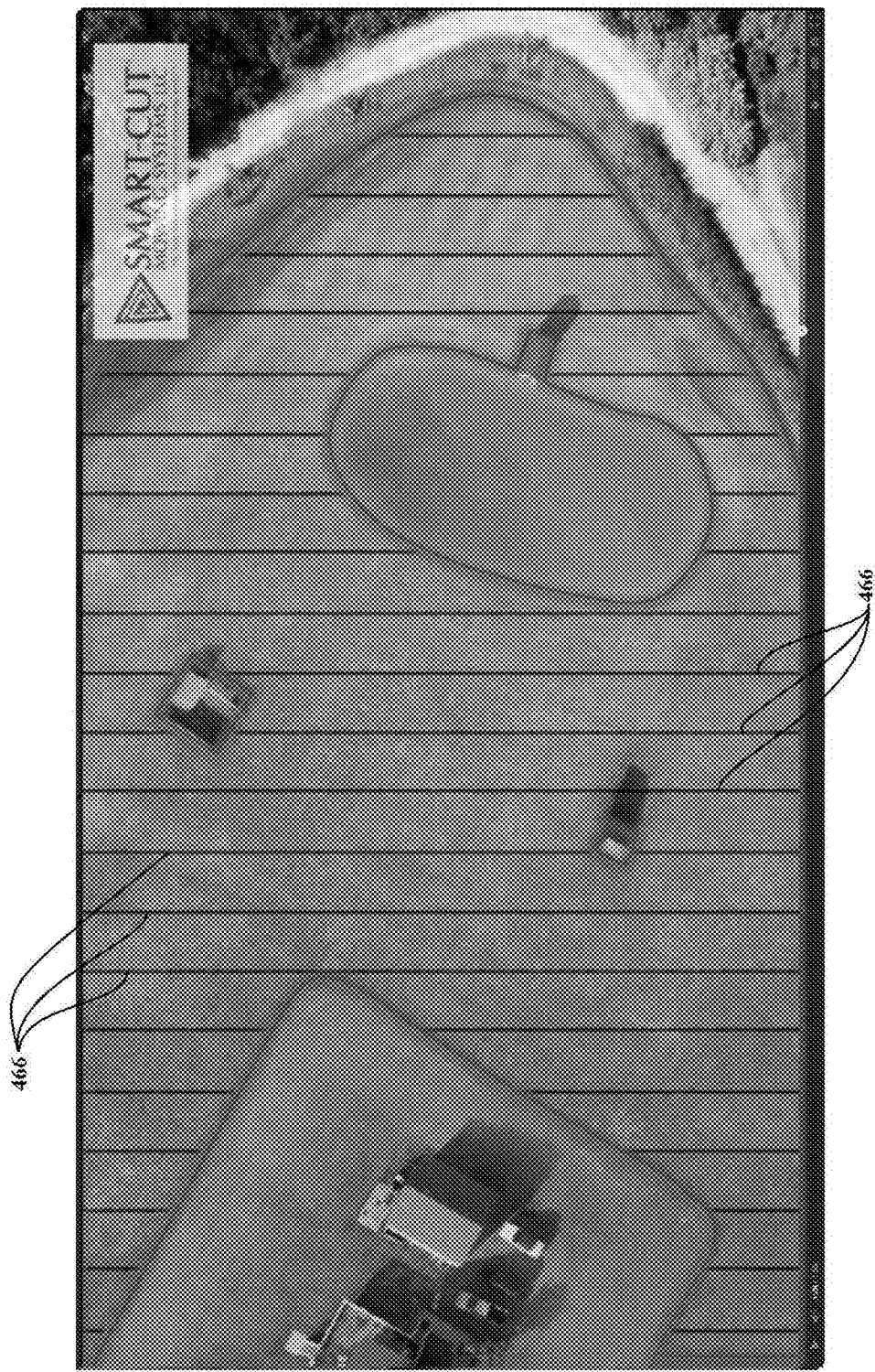
FIG. 3H is a schematic of an example third alternative optimized travel path primary direction for the machine of FIG. 2 over the area of FIG. 3A as calculated by the control system.

In various example embodiments the user 700 can instruct the control system 100 in a planning mode 500 to create alternative optimized travel paths 460, such as the most efficient travel paths characterized primarily by certain directions or shapes in the traveled path, such as round or spiral, horizontal (e.g., East-West), vertical (e.g., North-South), diagonal or angled (e.g., Southwest-Northeast), complimentarily angled (e.g., Northwest-Southeast), or a combination of the above, such as a weave, checkered, or crisscross pattern, as known in the art of lawn mowing. See for example, FIGS. 3F, 3G, 3H, depicting first 462, second 464, and third 466 example alternative optimized travel path primary directions, respectively, for a machine 200 to travel over an area 420 according to various optimized travel paths 460 as calculated by the control system 100. In the case of mowing grass, these features can be used to create visible patterns in the grass by the paths traveled by the machine 200. Alternatively, this functionality can be used to vary the path of the machine 200 so that it does not always take the same route, for instance to prevent ruts or other damage to the ground. Each of these optimized travel paths 460 generated by the control system 100 may be saved in or by the control system 100, and may be communicated from the control system 100 to another device, such as a mobile device 710 of a user 700 via wire or wirelessly, or wirelessly to a network and a server of a service provider 800, which may own, store, and maintain the data 470, for instance on a remote server 810 or on the cloud. Alternatively, a "mandatory mow only one way" option may be included to force operators 700 to mow or otherwise traverse a given area 420 in only a predetermined direction or pattern.

In certain example embodiments the optimized travel path data 470 may only be accessible for subsequent use when authorized by a service provider 800, for instance in exchange for a one-time or ongoing fee paid by the user 700 of the machine 200. Otherwise the data 470 and images 510 may not be available to the user 700 and may be removed or disabled in the user's device 710, in certain example embodiments. In various example embodiments the data 470 associated with multiple mowing locations 420 can be aggregated and processed to plan and allocate staffing, for instance where an entity such as a city has multiple parks and other areas 420 to mow.

In certain example embodiments the control system 100 may communicate to a remotely located service provider 800 how many times the machine 200 has traveled an optimized travel path 460, for instance for purposes of billing or maintenance of the machine 200 or for communicating information such as advertisements to the user 700.

In a programming mode 300, the control system 100 may be programmed with additional information regarding the machine 200 or may interface with other diagnostic systems on the machine 200 for purposes of monitoring the machine 200, and communicating maintenance suggestions or problem codes or other information 640 to the user 700 or to a remotely located service provider 800. In certain example embodiments a service provider 800 may automatically cause maintenance or repair parts to be shipped directly to the user 700 at appropriate times based on information 640 communicated from the control system 100 to the service provider 800. Communications can be accomplished by any suitable means, such as, for example, the Internet or phone networks, including but not limited to the control system 100 automatically logging-in to and syncing with Wi-Fi networks when available, or via Bluetooth or similar communications with a user's mobile device 710, or by 3G, 4G, etc., or other wireless phone networks, or by a hard-wire or wireless connection between the control system 100 and a user's mobile device 710, for instance, which may then communicate remotely with the service provider 800.

In various example embodiments the control system 100 may be adapted to improve the accuracy of optimized travel paths 460 each time the machine 200 travels them, for instance in an operating mode 600. For example, if the machine 200 is self-steering itself through a previously-determined optimized travel path 460 and the user 700 at any point overrides the control system 100 and manually steers the machine 200 for a period of time, the control system 100 may prompt the user 700 to indicate whether the manual deviation 610 should be added to the optimized travel path 460 to create updated optimized travel path data 630. For instance, if the user 700 had manually steered the machine 200 around a temporary obstacle 605, such as a tree branch laying on the ground, the user 700 may indicate "no" when prompted by the control system 100 whether to add the deviation 610 to the optimized travel path 460. But if the user 700 manually steered the machine 200 over a location where a now-removed obstacle 605 had previously been steered-around when the optimized travel path 460 was first created, then the user 700 could indicate "yes" so that next time the machine 200 will automatically travel over that location. Likewise, in subsequent trips the user 700 may manually steer the machine 200 closer or further away from the edge of obstacles or barriers to improve the process, and these improvements can thus be incorporated into the ever-improving optimized travel path data 630. After the user 700 manually intervenes to override the control system 100, the control system 100 may automatically, or upon a prompt from the user, return the machine 200 to traveling the optimized travel path 460.

Optimized travel path data 470 may in certain example embodiments be portable to other machines 200 that are desired to travel over the same area 440. For example, multiple machines 200 each having compatible control systems 100 may share optimized travel path data 470, or a control system 100 could be physically removed from one machine 200 and installed on a different machine 200. In various example embodiments an entire kit 160 may be transferable between different machines 200, the kit 160 comprising any or all of the GPS system 110 including antenna (not shown), control system 100, and auto-steering mechanism 150. In various example embodiments a wiring harness kit (not shown) may be added to a machine 200 to make it able to removably receive the present system. In various example embodiments the steering may be controlled automatically, while the operator 700 continues to manually control the machine's 200 speed, brakes, PTO functions, and the like. In other embodiments the machine 200 may be entirely autonomous. If the control system 100 is used on a new machine 200 that has different characteristics such as effective width 316 and turning radius 312 or other characteristics, that information can be entered into the control system 100 as an edit to, or new version of, the machine-specific data 310, which may then cause the optimized travel path data 470 to automatically update to be optimized for the new machine 200. Example information to enter for a particular machine 200 may include, for instance, turn radius 312, whether it is front or rear steer, wheelbase length 314, mowing deck configuration (including width 316) and location, and GPS location 415. The new machine 200 can then be used on the same area 420, and the control system 100 can learn any other differences in the operation of the new machine 200 by manually steering the new machine 200 when necessary (deviated movement 610), and automatically updating the optimized travel path 460 accordingly as previously described to create updated optimized travel path data 630.

An example embodiment will now be described, where an autonomously-steering machine 200 is configured to travel under its own power over one or more areas 440 by following one or more optimized travel paths 460. Such an autonomously-steering machine 200 may comprise a steering system 210 capable of being steered both manually by a user 700 and by an electronically-controlled steering controller device 150. A unitary structure 105 may also be provided that is removably attached with the autonomously-steering machine 200, the unitary structure 105 comprising a control system 100 as described herein. For example, such a unitary structure 105 may comprise: a processor structure 140 in electronic communication with the electronically-controlled steering controller device 150; a memory device structure 130 in electronic communication with the processor structure 140; a GPS system structure 110 in electronic communication with the memory device structure 130; and an electronic user interface structure 120 in electronic communication with the memory device structure 130. In various example embodiments the unitary structure 105 may be configured to: a) obtain and record the location of a starting point 410; b) continuously track location of the autonomously-steering machine 200 while it is moved and manually steered from the starting point 410 over an area; c) record the tracked location of the autonomously-steering machine 200 as map data 480 in the memory device structure 130; d) process the map data 480 in view of effective travel path width data 318 for the autonomously-steering machine 200 to determine one or more perimeters 430 of the one or more areas 440 over which the autonomously-steering machine 200 has traveled. The unitary structure 105 may further be configured to determine one or more perimeters 430 of any excluded areas 450 over which the autonomously-steering machine 200 did not travel within the one or more areas 440. Using any suitable optimization algorithm(s), the unitary structure 105 may then generate optimized travel path data 470 corresponding to one or more optimized travel paths 460 that when traveled by the autonomously-steering machine 200 will cause the autonomously-steering machine 200 to travel over the one or more areas 440 but not the one or more excluded areas 450 while tending to minimize the total distance traveled by the autonomously-steering machine 200. The electronically-controlled steering controller device 150 may be configured to steer the autonomously-steering machine 200 over the area 420 but not over the excluded areas 450 based on the optimized travel path data 470. The electronically-controlled steering controller device 150 may be further configured to be manually overridden to cause the autonomously-steering machine 200 to deviate from the one or more optimized travel paths 460, whereupon the unitary structure 105 may be configured to update the optimized travel path data 470 based on the deviation 610 at the option of the user 700, for instance by making an affirmative selection when prompted by the electronic user interface structure 120 of the unitary structure 105. In various example embodiments the unitary structure 105 may be a commercially available or customized version of a tablet computer, such as an Android tablet or an iPad or any number of similar devices made by any number of different manufacturers, and the electronic user interface structure 120 may comprise a touch screen, keyboard, or other sensor or transducer. It is understood that while the unitary structure 105 may be a tablet computer, any other suitable unitary structure 105 may be used, such as a laptop computer, smart phone, or any other electronic device that may be adapted to function as described herein. In various example embodiments the autonomously-steering machine 200 equipped with the present intelligent control apparatus and system may include any or all of the features and capabilities described herein, and may be used to accomplish any or all of the method steps described herein.

For example, provided in various example embodiments is a method of defining one or more optimized travel paths 460 for an autonomously-steering machine 200 to travel over one or more areas 440. Such a method may comprise the steps of: a) positioning the autonomously-steering machine 200 at a starting point 410, causing a GPS system 110 attached with the autonomously-steering machine 200 to obtain the location of the starting point 410, and causing a memory device 130 attached with the autonomously-steering machine 200 to record the starting point 410; b) manually steering the autonomously-steering machine 200 while causing it to move from the starting point 410 over the area 440; c) causing the GPS system 110 to continuously track the location 415 of the autonomously-steering machine 200 during said movement; d) causing the memory device 130 to record the tracked location 415 of the autonomously-steering machine 200 as map data 480 in the memory device 130; e) causing a processor 140 attached with the autonomously-steering machine 200 to process the map data 480 in view of machine-specific data 310 such as effective travel path width data 318 for the autonomously-steering machine 200 to determine one or more perimeters 430 of the one or more areas 440 over which the autonomously-steering machine 200 did travel; f) causing the processor 140 to process the map data 480 in view of the machine-specific data 310 for the autonomously-steering machine 200 to determine one or more perimeters 430 of any excluded areas 450 over which the autonomously-steering machine 200 did not travel within the one or more areas 440; g) causing the processor 140 to process the map data 480 and the machine-specific data 310 for the autonomously-steering machine 200 to generate optimized travel path data 470 corresponding to one or more optimized travel paths 460 that when traveled by the autonomously-steering machine 200 will cause the autonomously-steering machine 200 to travel over the one or more areas 440 but not the one or more excluded areas 450 while tending to minimize the total distance traveled by the autonomously-steering machine 200; h) moving the autonomously-steering machine 200 over the area 420 while an electronically-controlled steering controller device 150 attached with the autonomously-steering machine 200 and driven by the optimized travel path data 470 controls steering of the autonomously-steering machine 200; i) manually overriding the electronically-controlled steering controller device 150 during said movement in step h) to cause the autonomously-steering machine 200 to deviate from the one or more optimized travel paths 460; j) causing the GPS system 110 to continuously track location 415 of the autonomously-steering machine 200 during said deviated movement 610; k) causing the memory device 130 to record the tracked location 415 of the autonomously-steering machine 200 during said deviated movement 610 as deviated map data 620 in the memory device 130; l) after the beginning of said deviated movement 610, the user 700 interacting with an electronic user interface 120 in electronic communication with the memory device 130 to indicate whether the one or more optimized travel paths 460 should be updated with said deviated map data 620; and m) optionally causing the optimized travel path data 470 to update to correspond to said deviated map data 620 and thereby updating the optimized travel path 460 to correspond to said deviation 610, by the user 700 indicating with the electronic user interface 120 that the one or more optimized travel paths 460 should be updated with said deviated map data 620.

In various example embodiments the method may further comprise the steps of inputting into the processor device 140 machine-specific data 310 corresponding to the effective travel path width 316 and turning radius 312 of the autonomously-steering machine 200. In various example embodiments the autonomously-steering machine 200 may be a mower 200 having a cutting path width 316, and the steps of inputting into the processor device 140 machine-specific data 310 corresponding to the effective travel path width 316 may comprise inputting the cutting path width 316 into the processor 140, for instance during a programming mode 300. In various example embodiments the autonomously-steering machine 200 may comprise front and rear wheels 215 separated by a wheelbase length 314, the method further comprising the steps of inputting into the processor device 140 machine-specific data 310 corresponding to any of: the wheelbase length 314; the position of the wheels 215 relative to the mowing deck 205; identifying wheels 215 that pivot to steer the mower 200; or outer dimensions of portions of the mower 200, if any, that extend laterally beyond the wheels 215, and the locations of those portions, if any, relative to the mowing deck 205. In various example embodiments the method may further comprise causing any of the machine-specific data 310, map data 480, optimized travel path data 470, or updated optimized travel path data 630 to be electronically communicated from the memory device 130 to a remotely-located data storage device 810. In various example embodiments the method may further comprise causing any of the machine-specific data 310, map data 480, optimized travel path data 470, or updated optimized travel path data 630 to be electronically communicated from the remotely-located data storage device 810 to the memory device 130. In various example embodiments the method may further comprise causing any of the machine-specific data 310, map data 480, optimized travel path data 470, or updated optimized travel path data 630 to be electronically communicated from the remotely-located data storage device 810 to a second memory device 130 (not shown) attached with a second autonomously-steering machine 200 (not shown). In various example embodiments the method may further comprise causing the second autonomously-steering machine 205 to use any of the machine-specific data 310, map data 480, optimized travel path data 470, or updated optimized travel path data 630 to travel over the one or more areas 440 but not the one or more excluded areas 450. In various example embodiments steps h) through m) may be repeated serially a plurality of times.

In various example embodiments the processor device 140, memory device 130, GPS system 110, and electronic user interface 120 all form part of a unitary structure 105 that is removably attachable with the autonomously-steering machine 200, and the method further includes the steps of attaching and detaching the unitary structure 105 with the autonomously-steering machine 200. For example, a computer tablet 105 may be attached and detached with any suitable bracketry (not shown) attached with the autonomously-steering machine 200. In various example embodiments the electronically-controlled steering controller device 150 is removably attachable with the autonomously-steering machine 200, and the method further includes the steps of attaching and detaching the electronically-controlled steering controller device 150 with the autonomously-steering machine 200. In various example embodiments the method may further comprise causing the processor device 140 to track and the memory device 130 to store electronic usage data 640 corresponding to one or more durations of use of the autonomously-steering machine 200, the method further comprising the steps of causing the electronic usage data 640 to be electronically communicated to a remotely-located data storage device 810. In various example embodiments the method may further comprise causing information related to maintaining the autonomously-steering machine 200 based on the electronic usage data 640 to be electronically communicated to the user, such as the upcoming need for an oil change or other maintenance of the machine 200. In various example embodiments the method may further comprise electronically unlocking access to, or electronically unlocking the ability to use, the optimized travel path data 470 by making a payment to a party 800 in remote electronic communication with the processor 140. In various example embodiments the method may further comprise using a computer structure in electronic communication with the Internet, e.g., unitary structure 105, to access an electronic portal 820 through the Internet and thereby viewing or downloading information comprising any of the machine-specific data 310, map data 480, optimized travel path data 470, or updated optimized travel path data 630. In various example embodiments the method may further comprise viewing or downloading information comprising any of the machine-specific data 310, map data 480, optimized travel path data 470, or updated optimized travel path data 630, for instance by viewing or downloading an image of a map 510 of the area 420 overlaid with an optimized travel path 460. In various example embodiments the method may further comprise using a computer structure in electronic communication with the Internet to access an electronic portal 820 through the Internet and thereby viewing or downloading any of the electronic usage data 640 corresponding to one or more durations of use of the autonomously-steering machine 200, or information related to maintaining the autonomously-steering machine 200 based on the electronic usage data 640. Such information can be oil change recommendations or any other desired maintenance-related information for the machine 200. In various example embodiments the method may further comprise causing the processor 140 to generate optimized travel path data 470 corresponding to a plurality of optimized travel paths 460 that when traveled by the autonomously-steering machine 200 will cause the autonomously-steering machine 200 to travel over the one or more areas 440 but not the one or more excluded areas 450 while tending to minimize the total distance traveled by the autonomously-steering machine 200; wherein the plurality of optimized travel paths 460 include travel paths at different angles that each create unique visual effects on the area 440 when the autonomously-steering machine 200 travels on said travel paths 460. For example, optimized travel paths 460 with primary path directions with north-south, east-west, or any other orientations or patterns (such as checkerboard) may be calculated for a given area 440.

Also provided in various example embodiments is record-replay functionality, where an autonomously-steering machine 200 may be configured to travel under its own power over a path 440 (e.g., FIG. 3B) manually chosen by the user 700 while in a record mode, e.g., by driving the tractor 200 normally over an area 420, and then to steer automatically over that exact same path 440 one or more times at the option of the user 700 in a replay mode. In these embodiments the autonomously-steering machine 200 may comprise: a steering system 210 capable of being steered either manually by a user 700 or by an electronically-controlled steering controller device 150; and an electronically-controlled steering controller device 150. A unitary structure 105 may also be provided that is removably attached with the autonomously-steering machine 200, the unitary structure 105 comprising a control system 100 as described herein. For example, such a unitary structure 105 may comprise: a processor structure 140 in electronic communication with the electronically-controlled steering controller device 150; a memory device structure 130 in electronic communication with the processor structure 140; a GPS system structure 110 in electronic communication with the memory device structure 130; and an electronic user interface structure 120 in electronic communication with the memory device structure 130. In various example embodiments the unitary structure 105 may be configured to: a) obtain and record the location of a starting point 410; b) continuously track location of the autonomously-steering machine 200 while it is moved and manually steered from the starting point 410 over an area; c) record the tracked location of the autonomously-steering machine 200 as map data 480 in the memory device structure 130; and d) replay the map data 480 to cause the autonomously-steering machine 200 to travel over precisely the same tracked location (i.e., path 440) that was recorded. In these embodiments the electronically-controlled steering controller device 150 is configured to steer the autonomously-steering machine 200 over precisely the same tracked location 440 that was recorded as map data 480. By "exact" same path it is meant that the tractor or other machine 200 can reproduce the same path within a matter of inches, for instance within twelve, nine, six, three, two, or even one inch repeatability.

Example Web Interface Features

Various aspects of an example web interface system 820 will now be discussed. A unique web application may be provided to support the present system and method of use. Such a web application may provide an electronic portal 820 used to configure information and serve as a data repository to support an application running on a computer tablet 105, for instance. Additional administrative features such as customer setup, licensing, and the like may also be provided by such a web application, which may allow an application running on a control system 100 such as a tablet 105 or other user device 710, for example, to communicate with a remotely hosted website 820. Example features of such a web interface system 820 may include any or all of the following features, for example.

Machine Maintenance: Customers may add mowers, sprayers, rakers, snow plows, or other machines 200 to their available inventory. A machine 200 may be selected when a job or path plan 460 is selected.

Work Order: A work order may be a specific assigned schedule of work. A work order may be created by either selecting a schedule, such as a collection of jobs, or selecting one specific job. A work order may also be assigned a date and user 700 that may complete the work. When a work order is modified or created a message may be sent to the assigned user's tablet 105 or other electronic device 710, so they are aware of any related changes. The notification system may utilize Google Cloud Messaging (GCM), for example, to push notification updates to the user 700.

Work Order Map View: A work order map view may show all work orders and related status displayed as points on a map 510 for a given day.

Schedule: Schedules may be defined units of work that may be completed by an operator 700. Schedules may be comprised of a collection of jobs that define specific tasks to complete at a location or area 420.

Schedule Job: Scheduling a job may define a specific task to be performed at a location or area 420. The job may have a defined job type such as mow or spray. A job may also contain a location 415 and related path plan 460 for the job. The path plan 460 may be dependent upon the type of machine 200 being used. As an example, mowers with different sized mower decks 205 may use different path plans, as the distance between passes may account for the width of the mower deck 205. Other information may be provided and associated with a job, such as "drive time" to allocate time to get from one job to another on a job schedule.

Job Location: A location 415 may be used as the basis for a path plan 460 used within a job. A location 415 may be selected from a map 510, so that a specific GPS coordinate can be stored for the location 415. That point may be used in later rendering of maps 510 and overlays of the path plans 460. A location may be assigned one or more starting points 410 that are the origin point for path plans 460. Multiple path plans 460 may be assigned to a location or area 420 as well.

Path Plans: Path plans 460 may define the precise route that may be taken to complete an activity by a machine 200. Path plans 460 may originally be defined by an application running on a tablet or other electronic device 105 by driving the complete path or perimeter 430 of the path on the machine 200. On the website 820, path plans 460 may be modified by drawing different line segments on the path plans 460 on the map 510. The drawn coordinates may be passed to a Path Planning API to create the actual path plan 460. See for example, FIGS. 3F, 3G, 3H, depicting first 462, second 464, and third 466 example alternative optimized travel path primary directions, respectively, for a machine 200 to travel over an area 420 according to various optimized travel paths 460 as calculated by the control system 100. It is intended that path plans 460 may be modified on the web 820 (not originally created), and "hints" may be provided to the Path Plan API to help determine more optimal routes. Other suitable functionalities may be employed. If a supervisor only surveys the perimeter 430 of an area 420, users 700 may invoke the creation of the path plan API from this page 820 as well. Users 700 may be able to view a list of perimeter 430 path plans that need to have the Path Plan API called upon to complete the path plan 460.

Employee Schedule Calendar: An employee schedule calendar may provide an overview of all jobs assigned to employees 700 throughout the day or other period of time, for instance in a calendar format. Additional jobs can be scheduled for specific times, and employees 700 may be assigned to jobs from the employee schedule calendar. Specific employees 700 may also be selected within the calendar view to filter the displayed jobs.

Location History: A location history may be used to show a history of the paths 460 that were used at specific locations 420. This may help a supervisor (who may also be considered a user 700 for purposes of this disclosure) ensure different paths 460 are being utilized at each location 420, for example.

View Licenses: Customers (who may also be considered a user 700 for purposes of this disclosure) may view their active licenses on a view license page. The licenses may be associated with a control system 100 that can control the machines 200.

Customer User Account: A customer user account maintenance page may allow customer administrators (who may also be considered a user 700 for purposes of this disclosure) to add other customer administrators 700 or operator users 700 to their company. The initial customer administrator 700 for a company may be set up by when the company purchases a system or access to a system.

Following are descriptions of various exemplary Site Administrator Functionalities according to various example embodiments.

User Account: Site administrators 800 may be responsible to maintain users 700. Users 700 may be assigned roles that control access to functionality within the system.

License Management: Site administrators 800 may use a license management page to add licenses for a customer 700. Licenses may be associated with a serial number of a control system 100 that is used to guide machines 200.

Customer Setup: Site administrators 800 may maintain customer companies within the system. Basic information may be stored within the website 810 about customers 700, and site administrators 800 may use a third-party CRM (customer relationship management) application to track any or all of their customer information.

Machine Templates: A machine template maintenance page may be used to configure types of machines 200 that are compatible with the system.

Request Diagnostics: A diagnostics request page may assist with support by requesting diagnostics information remotely from the machines 200.

Web Service Usage Report: A web service usage report may be used for diagnostic functionality to determine web service usage, overall response times, and check for any errors that occur during web service calls.

Authenticate User: Authenticates a user ID and password combination for the company 700. This may be used to authenticate users 700 on the table.

List Machines: Lists all machines 200 associated with the customer 700.

List Machine Types: Lists all types of machines 200 in the system.

List Work Orders for Date: Lists work orders for the customer 700 on a provided date. This can be used to list all work orders for a customer 700. For performance purposes, this may only return top level work order information. Details for a work order may be retrieved via a GetWorkOrderDetails function.

List User Work Orders for Date: Lists all work orders for a specific user 700 on a provided date. This can be used to list all work orders assigned to a user 700. For performance purposes, this may only return top level work order information. Details for a work order may be retrieved via a GetWorkOrderDetails function.

Get Work Order Details: Returns a work order with details to process the work order on the tablet 105, for instance. The returned work order may also return related activities, locations 420, and path plan 460 identifiers.

List Locations: Lists all location header information. This can be used to list all locations 420 to users 700.

Get Location Details: Gets detailed information for a requested location 420.

Add Location: Adds a new location 420 to the system.

Add Location Perimeter: Adds a perimeter 430 path plan to an existing location 420.

Add Location Path Plan: Adds a path plan 460 that was recorded on the machine 200. The uploaded KML (Keyhole Markup Language) file may be uploaded to a content delivery network or content delivery network (CDN) for future downloads.

Add Location Obstacle: Adds an obstacle path 620, 630 to an existing location 420.

Update Location Boundary: Updates the coordinates for a boundary 430.

Update Work Order: Updates a work order. This can be used to change the work order status, job percentage complete, or other information related to a work order.

Update Work Order Job: Updates a specific job within a work order. This can be used to update job percentage complete, or other information related to a work order job.

Verify License: Verifies the license information for a customer 700.

Example Electronics Hardware

Figure 4:
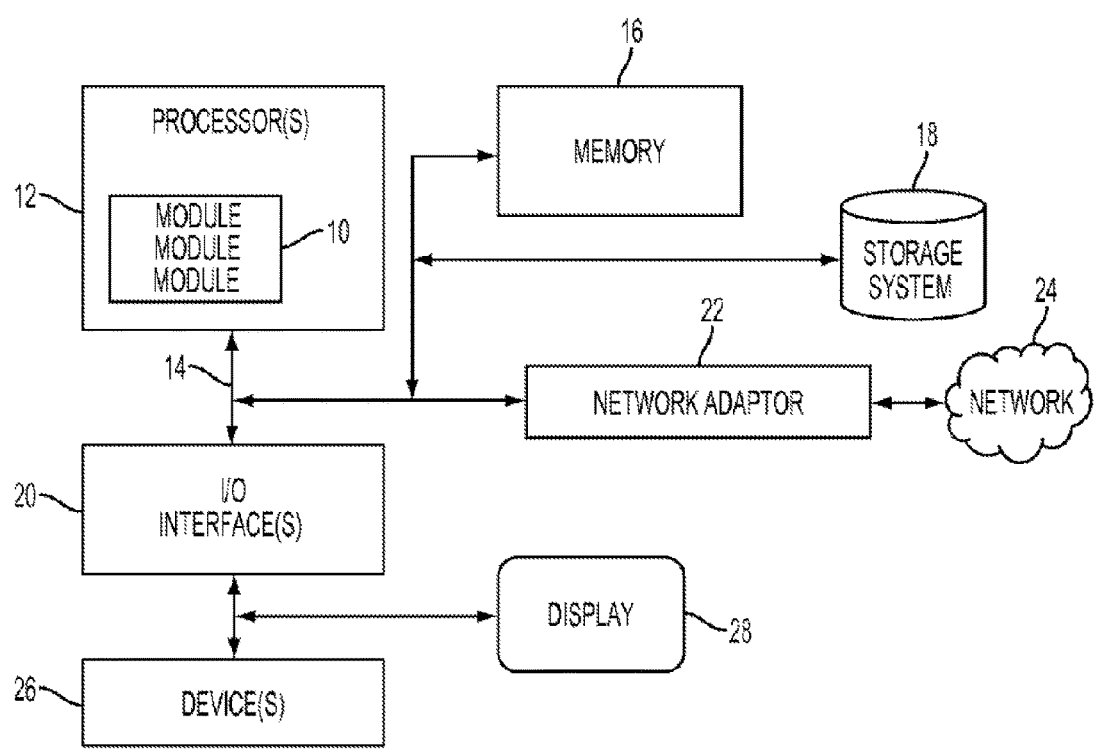
FIG. 4 is a diagram showing example electronic components of a control system according to various example embodiments.
Figure 5:
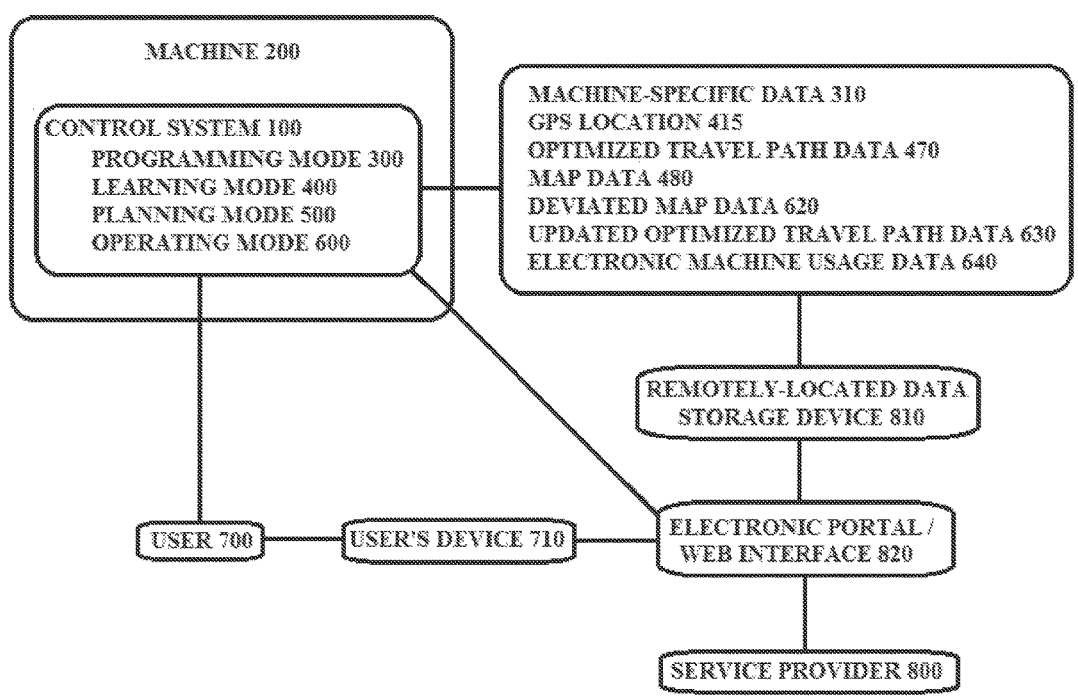
FIG. 5 is a diagram depicting various aspects of example embodiments.

Example computer, electronics, and hardware for the control system 100 will now be discussed. FIG. 4 illustrates a schematic of an example computer or processing system that may implement the methodology of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 4 may include, but are not limited to, tablet computers (or simply "tablets"), smart phones, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include one or more components of one or more translation/transformation modules 10 that perform the methods described herein, such as modules 2200 through 4000. The modules 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

Any of the suitable technologies discussed in the patents and published patent applications that are incorporated herein may be used to implement various example aspects of the invention as would be apparent to one of skill in the art.

Although exemplary embodiments and applications of the invention have been described herein including as described above and shown in the included example Figures, there is no intention that the invention be limited to these exemplary embodiments and applications or to the manner in which the exemplary embodiments and applications operate or are described herein. Indeed, many variations and modifications to the exemplary embodiments are possible as would be apparent to a person of ordinary skill in the art. The invention may include any device, structure, method, or functionality, as long as the resulting device, system or method falls within the scope of one of the claims that are allowed by the patent office based on this or any related patent application.

What is claimed is:

1. A method of defining one or more optimized travel paths for an autonomously-steering machine to travel over one or more areas, comprising:
   a) positioning the autonomously-steering machine at a starting point, causing a GPS system attached with the autonomously-steering machine to obtain a location of the starting point, and causing a memory device attached with the autonomously-steering machine to record the starting point;
   b) manually steering the autonomously-steering machine while causing it to move from the starting point over the one or more areas;
   c) causing the GPS system to continuously track location of the autonomously-steering machine during said movement;
   d) causing the memory device to record the tracked location of the autonomously-steering machine as map data in the memory device;
   e) causing a processor attached with the autonomously-steering machine to process the map data in view of effective travel path width data for the autonomously-steering machine to determine one or more perimeters of the one or more areas over which the autonomously-steering machine did travel;
   f) causing the processor to process the map data in view of the effective travel path width data for the autonomously-steering machine to determine one or more perimeters of any excluded areas over which the autonomously-steering machine did not travel within the one or more areas;
   g) causing the processor to process the map data and the effective travel path width data for the autonomously-steering machine to generate optimized travel path data corresponding to one or more optimized travel paths that when traveled by the autonomously-steering machine will cause the autonomously-steering machine to travel over the one or more areas but not the one or more excluded areas while tending to minimize total distance traveled by the autonomously-steering machine;
   h) moving the autonomously-steering machine over the area while an electronically-controlled steering controller device attached with the autonomously-steering machine and driven by the optimized travel path data controls steering of the autonomously steering machine;
   i) manually overriding the electronically-controlled steering controller device during said movement in step h) to cause the autonomously-steering machine to deviate from the one or more optimized travel paths;
   j) the processor automatically causing the OPS system to continuously track location of the autonomously-steering machine during said deviated movement without a user interacting with the processor;
   k) the processor automatically causing the memory device to record the tracked location of the autonomously-steering machine during said deviated movement as deviated map data in the memory device without the user interacting with the processor;
   l) after beginning said deviated movement, an electronic user interface in electronic communication with the memory device automatically prompting the user to indicate whether the one or more optimized travel paths should be updated with said deviated map data; and
   m) causing the optimized travel path data to update to correspond to said deviated map data and thereby updating the optimized travel path to correspond to said deviation, by the user indicating with the electronic user interface that the one or more optimized travel paths should be updated with said deviated map data.

2. The method of claim 1, further comprising the steps of inputting into the processor device machine-specific data corresponding to the effective travel path width and turning radius of the autonomously-steering machine.

3. The method of claim 2, wherein the autonomously-steering machine comprises a mower having a cutting path width, and the steps of inputting into the processor device machine-specific data corresponding to the effective travel path width comprises inputting the cutting path width into the processor.

4. The method of claim 3, wherein the autonomously-steering machine comprises front and rear wheels separated by a wheelbase length, the method further comprising the steps of inputting into the processor device machine-specific data corresponding to any of:
   the wheelbase length;
   positions of the front and rear wheels relative to a mowing deck;
   identifying wheels that pivot to steer the autonomously-steering machine; or
   outer dimensions of portions of the machine that extend laterally beyond the wheels, and locations of those portions relative to the mowing deck.

5. The method of claim 1, further comprising the steps of:
   causing any of the machine-specific data, map data, optimized travel path data, or updated optimized travel path data to be electronically communicated from the memory device to a remotely-located data storage device.

6. The method of claim 5, further comprising the steps of:
causing any of the machine-specific data, map data, optimized travel path data, or updated optimized travel path data to be electronically communicated from the remotely-located data storage device to the memory device.

7. The method of claim 5, further comprising the steps of:
causing any of the machine-specific data, map data, optimized travel path data, or updated optimized travel path data to be electronically communicated from the remotely-located data storage device to a second memory device attached with a second autonomously-steering machine.

8. The method of claim 7, further comprising the steps of:
causing the second autonomously-steering machine to use any of the machine-specific data, map data, optimized travel path data, or updated optimized travel path data to travel over the one or more areas but not the one or more excluded areas.

9. The method of claim 1, wherein steps h) through m) are repeated serially a plurality of times.

10. The method of claim 1, wherein the processor device, memory device, GPS system, and electronic user interface all form part of a structure that is removably attachable as a unit with the autonomously-steering machine, and the method further includes the steps of attaching and detaching the structure as a unit with the autonomously-steering machine.

11. The method of claim 10, wherein the electronically-controlled steering controller device is removably attachable as a unit with the autonomously-steering machine, and the method further includes the steps of attaching and detaching the electronically-controlled steering controller device as a unit with the autonomously-steering machine.

12. The method of claim 1, further comprising the steps of causing the processor device to track and the memory device to store electronic usage data corresponding to one or more durations of use of the autonomously-steering machine, the method further comprising the steps of causing the electronic usage data to be electronically communicated to a remotely-located data storage device.

13. The method of claim 12, further comprising the steps of causing information related to maintaining the autonomously-steering machine based on the electronic usage data to be electronically communicated to the user.

14. The method of claim 1, further comprising the steps of obtaining electronic access to the optimized travel path data by making a payment to a party in remote electronic communication with the processor.

15. The method of claim 1, further comprising the steps of using a computer structure in electronic communication with the Internet to access an electronic portal through the Internet and thereby viewing or downloading information comprising any of the machine-specific data, map data, optimized travel path data, or updated optimized travel path data.

16. The method of claim 15, wherein the steps of viewing or downloading information comprising any of the machine-specific data, map data, optimized travel path data, or updated optimized travel path data, comprises viewing or downloading an image of a map of the area overlaid with an optimized travel path.

17. The method of claim 12, further comprising the steps of using a computer structure in electronic communication with the Internet to access an electronic portal through the Internet and thereby viewing or downloading: any of the electronic usage data corresponding to one or more durations of use of the autonomously-steering machine; or information related to maintaining the autonomously-steering machine based on the electronic usage data.

18. The method of claim 1, further comprising the steps of causing the processor to generate optimized travel path data corresponding to a plurality of optimized travel paths that when traveled by the autonomously-steering machine will cause the autonomously-steering machine to travel over the one or more areas but not the one or more excluded areas while tending to minimize the total distance traveled by the autonomously-steering machine;
wherein the plurality of optimized travel paths include travel paths at different angles for creating unique visual effects on the area when the autonomously-steering machine travels on said travel paths.

19. An autonomously-steering machine configured to travel under its own power over one or more areas by following one or more optimized travel paths, the autonomously-steering machine comprising:
a steering system capable of being steered either manually by a user or by an electronically-controlled steering controller device;
an electronically-controlled steering controller device;
a structure that is removably attached as a unit with the autonomously-steering machine, the structure comprising:
a processor structure in electronic communication with the electronically-controlled steering controller device;
a memory device structure in electronic communication with the processor structure;
a GPS system structure in electronic communication with the memory device structure; and
an electronic user interface structure in electronic communication with the memory device structure;
wherein the structure is configured to:
a) obtain and record a location of a starting point;
b) continuously track location of the autonomously-steering machine while it is moved and manually steered from the starting point over an area;
c) record the tracked location of the autonomously-steering machine as map data in the memory device structure;
d) process the map data in view of effective travel path width data for the autonomously-steering machine to determine one or more perimeters of the one or more areas over which the autonomously-steering machine has traveled, to determine one or more perimeters of any excluded areas over which the autonomously-steering machine did not travel within the one or more areas, and to generate optimized travel path data corresponding to one or more optimized travel paths that when traveled by the autonomously-steering machine will cause the autonomously-steering machine to travel over the one or more areas but not the one or more excluded areas while tending to minimize the total distance traveled by the autonomously-steering machine;
the electronically-controlled steering controller device configured to steer the autonomously-steering machine over the area but not over the excluded areas based on the optimized travel path data, and further configured to be manually overridden by the user steering the autonomously-steering machine to deviate from the one or more optimized travel paths, without the user interacting with the processor, whereupon the structure is configured to automatically update the optimized travel path data based on die deviation at an option of the user.

20. An autonomously-steering machine configured to travel under its own power over one or more areas by precisely following one or more travel paths that was previously recorded, the autonomously-steering machine comprising: a steering system capable of being steered either manually by a user or by an electronically-controlled steering controller device; an electronically-controlled steering controller device; a structure that is removably attached as a unit with the autonomously-steering machine, the structure comprising: a processor structure in electronic communication with the electronically-controlled steering controller device: a memory device structure in electronic communication with the processor structure; a GPS system structure in electronic communication with the memory device structure; and an electronic user interface structure in electronic communication with the memory device structure; wherein the structure is configured to: a) obtain and record the location of a starting point; b) continuously track location of the autonomously-steering machine while it is moved and manually steered from the starting point over an area: c) record the tracked location of the autonomously-steering machine as map data in the memory means; d) replay the map data to cause the autonomously-steering machine to travel over precisely the same tracked location that was recorded; the electronically-controlled steering controller device configured to steer the autonomously-steering machine over precisely the same tracked location that was recorded as map data; the electronically-controlled steering controller device further configured to steer the autonomously-steering machine over the area but not over one or more excluded areas based on one or more optimized travel path data, and further configured to be manually overridden by the user steering the autonomously-steering machine to deviate from the one or more optimized travel paths without the user interacting with the processor, whereupon the structure is configured to automatically update the one or more optimized travel path data based on the deviation at an option of the user.

* * * * *